July 29, 1958     O. LIZE ET AL     2,844,988
APPARATUS FOR DETERMINING NECESSARY CORRECTIONS
OF AT LEAST THREE CONSTITUENT
COLORS OF A COLORED IMAGE
Filed Aug. 2, 1955
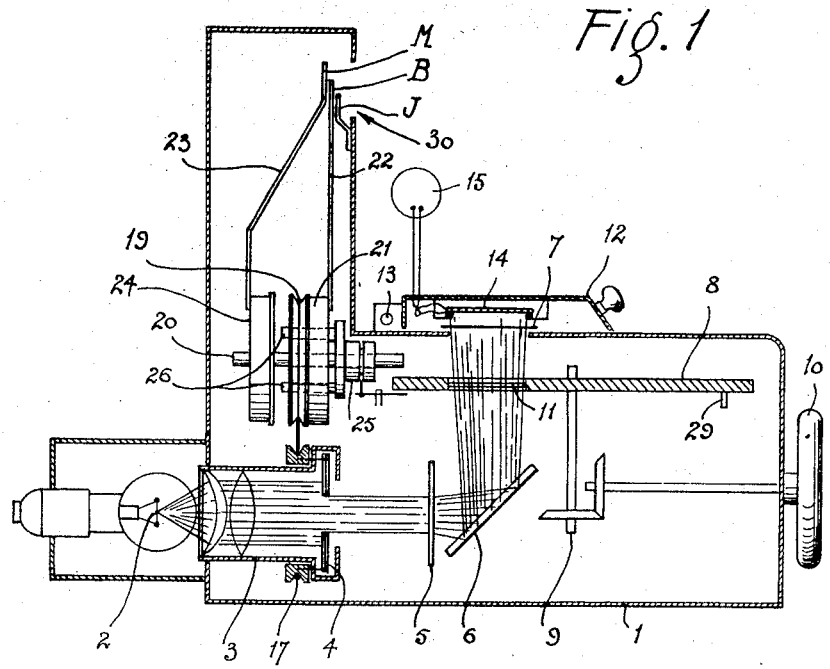
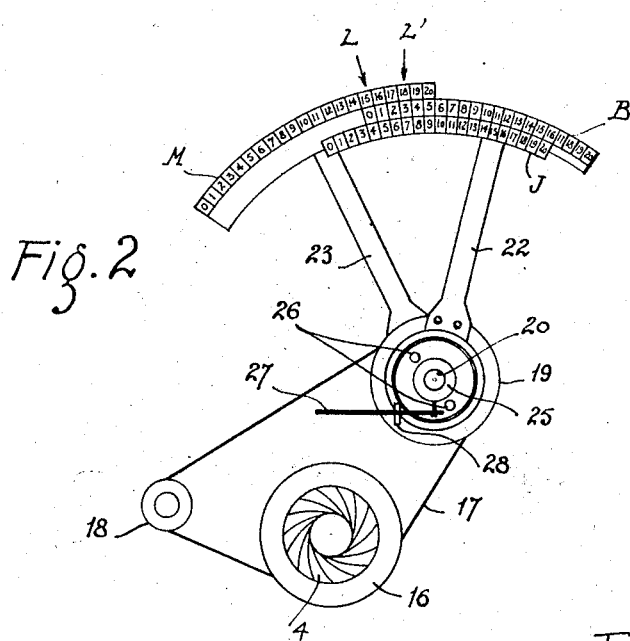
Inventors:
Octave Lize
Jacques Lize
By Young, Emery & Thompson
Attys.

United States Patent Office 2,844,988
Patented July 29, 1958

2,844,988

APPARATUS FOR DETERMINING NECESSARY CORRECTIONS OF AT LEAST THREE CONSTITUENT COLORS OF A COLORED IMAGE

Octave Lize and Jacques Lize, Paris, France

Application August 2, 1955, Serial No. 525,952

Claims priority, application France April 15, 1955

6 Claims. (Cl. 88—14)

The present invention relates to an apparatus intended to control the balance of three constituents of an image in colour and to determine the corrections necessary to be made to such images with a view to obtaining a reproduction which is satisfactory in practice.

The applicants have already described in their French patent of February 1, 1954, No. 1,098,998, for "An Apparatus for Measuring the Density of Colours" an apparatus which enables a quantitative analysis to be made of the colours composing the shades of an object or of a source of light of any kind.

The technique employed in this apparatus, which is again made use of in an improved form in the apparatus forming the object of the present invention, is based on the discovery of the fact that in a photographic negative in colours, what ever may be the nature and the distribution of the colours of the object photographed, a satisfactory reproduction in practice of this object implies a quantitative balance of the relative effective density of the three constituents, for example of the three superposed layers of a photographic negative in colours of the subtractive type. In other words, when a negative of this kind is illuminated by a beam of white light which is successively filtered by screens corresponding to the three usual primary colours, that is to say blue, green and red, the respective rays of light transmitted by the negative will have substantially equal intensities. In the general case, it is found that there will be an excess of intensity for two primary colours with respect to a third, and the corrections to be introduced during reproduction will be represented by the values or the "numbers" of the two supplementary screens which are required to restore the balance.

In the apparatus which formed the object of the previous patent referred to above, this operation of analysis or calibration of the colours which compose the tints of an object or of a source of light was carried out with a constant incident illumination by means of three sets of coloured screens, the densities of which increased in each set following a predetermined progression and by values calibrated in screen numbers.

An apparatus designed in this way, although it gives satisfactory results, has the drawback that it requires three sets of coloured screens of predetermined densities which remain constant with time, and also a totalising counter device which indicates automatically at the end of the operations the resultant correction to be adopted, unless it is thought sufficient to determine the corrections by calculation.

The present invention is directed to an apparatus of more simple construction which is more flexible and easier in use.

An apparatus in accordance with the present invention comprises essentially, following a source of light of constant intensity and colour temperature and an optical condenser, a progressive diaphragm adapted to be coupled to two moving scales which co-operate with a fixed scale, a diffuser, a negative carrier, a set of three screens coloured with the respective primary colours associated with the three scales and adapted to be placed in succession between the diffuser and the negative, and a photo-electric cell associated with an indicating instrument placed after the negative.

In an apparatus designed in this way, the balancing of the three colours will be effected by variation of the incident rays of light by means of the progressive diaphragm, and not by a selective attenuation of a constant incident illumination by means of sets of screens of progressively increasing densities. An arbitrary value of the outgoing light being registered in the first place on the indicating instrument with the screen associated with the fixed scale for a predetermined aperture of the diaphragm, it is then only necessary to determine for each of the two other screens the opening which will give the same value of outgoing light: the displacement of the two corresponding moving scales will indicate the corrections required. The scales may be graduated directly in screen numbers with respect to the aperture of the diaphragm and as a function of a previous calibration, in which account can be taken of the method of operation of each laboratory and also, if need be, of the nature of the films employed.

The special features and advantages of the invention will also be brought out in the course of the description which is given below, by way of example, and with reference to the attached drawings, in which:

Fig. 1 is a diagrammatic view in cross-section of an apparatus in accordance with the invention and designed with a view to the analysis of photographic negatives in colours of the subtractive type.

Fig. 2 is a detailed view of the control device for the shutter.

In accordance with the form of embodiment chosen and shown, the apparatus comprises a chassis 1 within the interior of which is arranged an optical path starting from an electric lamp 2 of the point source type and with a controlled voltage supply, and comprising a condenser system 3 giving a parallel beam of rays, an iris diaphragm 4, a ground or opaline sheet of glass 5 diffusing a uniform illumination which is directed by means of a mirror 6 on to the negative to be examined, which is placed at 7 above an opening formed for that purpose in the upper face of the chassis. A disc 8, rotatably-mounted on a vertical spindle 9 and operated by means of a hand-wheel 10, enables any one of three screens such as 11 to be interposed in the path of the beam so as to colour the light blue, green and red in succession. In addition, the disc is provided with a fourth position having an opening not provided with a screen and corresponding to the position of rest. A hinged flap 12, pivoted about an axis 13 and intended to press the negative, comprises a photo-electric cell 14 with a stop layer, and connected to a galvanometer 15.

The ring 16 of the iris diaphragm 4 is coupled by means of a belt 17 to a driving pulley 18 rigidly fixed to an operating knob (not shown) and to a pulley 19 rotatably mounted on a spindle 20 and rigidly fixed to a ring 21 which carries a first moving scale B at the end of an arm 22. A second moving scale M is mounted at the end of an arm 23 fixed to a ring 24 which is also rotatably mounted on the spindle 20. A device known as a selector enables the moving scale M to be coupled to the other moving scale B; this device comprises a sleeve 25 adapted to rotate and slide on the spindle 20 and provided with two studs 26 which pass through the assembly formed by the ring 21 and the pulley 19 so as to be able to engage in the ring 24, thus coupling together the two moving scales. A lever 27 pivoted on a spindle 28 carries at the end of one of its arms a fork engaged in a groove formed for that purpose in the sleeve 25, whilst its other arm is located on the path of a finger 29 on the disc 8, the assembly being arranged in such a way that the studs are withdrawn from engagement with the ring 24 when the red screen is placed on the optical path of the apparatus; the moving scale M is then disengaged from the moving scale B and is fixed in the position to which it has been previously brought.

The two moving scales M and B appear behind an observation window 30 formed for that purpose in the chassis of the apparatus, at the same time as a fixed scale J. Each of the three scales J, B and M, is divided into twenty equal separations, numbered from 0 to 20 and corresponding to the total travel of the iris diaphragm. The fixed scale J is associated with the blue screen and will indicate the values of the yellow filters; the movable scale B, which is in direct coupling with the iris diaphragm is associated with the red screen and will indicate the values of the blue-green filters; the moving scale M which can be coupled to that previously mentioned is associated with the green screen and indicates the values of the magenta filters.

The method of operation of the apparatus is as follows:

The negative to be examined is placed at 7 under the flap 12, the disc 8 being in the position of rest (white light), and the diaphragm 4 being fully open.

The blue screen is then interposed and the value of the illumination indicated by the galvanometer is registered.

The blue screen is now replaced by the green screen and by means of the control knob fixed to the pulley 18, the diaphragm is closed in order to bring back the indication of the galvanometer to the indication corresponding to the same illumination as before. The scale M has now been fixed to the scale B and is thus moved to a certain position.

The green screen is then replaced by the red screen. The finger 29 of the disc 8 causes the lever 27 to rock, and this moves the sleeve 25 and frees the studs 26 from the ring 24; the scale M is thus disengaged from the scale B and is left in its previously-determined position. The setting of the diaphragm aperture is then readjusted until the previously recorded illumination on the galvanometer is again obtained; the scale B, which is the only one actuated during this movement of adjustment, is fixed in its turn in a certain position.

The operations are now complete and it is only necessary to read-off from the scales the densities or values of the filters to be used during the reproduction of the negative under examination. This reading will be made, as shown by the arrow L of Fig. 2, in alignment with the zero of the scale which is furthest towards the right, namely, in the case of the example shown, opposite the zero of the scale B. The reading in this case will be: 15 magenta and 4 yellow.

Equivalent readings could, in general, be carried out to the right of this position, for example at L': 18 magenta, 3 blue-green and 7 yellow. This amounts to the same thing as increasing by three units the value of each filter, that is to say as introducing in the reproduction a gray of a value of three units. The reading made opposite the zero which is furthest to the right thus has the advantage of automatically cutting out the gray and in fixing immediately and without calculation the values of the filters to be used during the reproduction.

Experience has shown that the relation between the variations in section of the iris diaphragm on the one hand and the progression of the values or screen numbers on the other hand, is such that it will lead to a substantially linear graduation of the scales which facilitates the manufacture of the apparatus and makes it more agreeable to use. A relative adjustment of the scales, either with respect to the diaphragm or as between each other is always made possible, for example, by an adjustable mounting of their supporting arms 22, and 23 on the respective rings 21 and 24.

It will, course, be well understood that the invention is in no way limited to the form of embodiment selected and shown, this having been given by way of example only; the details of construction may, on the other hand, form the subject of a number of modifications depending on the kind of application considered.

What we claim is:

1. Apparatus for determining necessary corrections of at least three constituent colours of a coloured image for reproducing purposes, comprising: a source of light of constant intensity and constant colour-temperature; an optical condenser for giving a substantially parallel beam from said source; a diaphragm having a continuously variable aperture interposed on said beam; rotatable means for varying said diaphragm-aperture; at least two moving scales associated with a fixed scale; means for conjointly controlling the movement of the said diaphragm and the said moving scales; means for directing the said beam on a photographic negative comprising the said image; at least three color screens; means for successively interposing said colour screens between the said diaphragm and the said negative; a photo-electric cell disposed behind the said negative; and indicating means actuated by the said cell to obtain transmission through said negative for each of said screens, whereby the indication obtained with one of the said screens interposed is again repeated with a second screen by varying the diaphragm-aperture, with consequent displacement of at least one of the two said moving scales, the operation being repeated for the next successive screen with a correcting movement of the diaphragm and consequent movement of the third moving scale with respect to the other two scales, whereby one is enabled after the final indication to read from the scale the values of the color filters required for reproducing said negative.

2. Apparatus as claimed in claim 1, in which an optical diffusing element is interposed on the said parallel beam between the diaphragm and the coloured image.

3. Apparatus as claimed in claim 1, in which one of the said moving scales is permanently coupled for movement with the said diaphragm, the other said moving scale being adapted to be engaged with and disengaged at will from the said first moving scale.

4. Apparatus as claimed in claim 1, in which the said fixed scale is associated with a blue screen to indicate values of yellow filters required, the first said moving scale is associated with a red screen to indicate values of blue-green filters, and the second said moving scale is associated with a green screen to indicate values of magenta filters.

5. Apparatus as claimed in claim 1, in which the first said moving scale is permanently coupled for rotation with the actuating ring of the said diaphragm, the second said moving scale being normally coupled for rotation with the said first moving scale and being disengaged from said first moving scale and immobilized in position when the coloured screen corresponding to the said first moving scale is inserted in the path of the said parallel beam of rays.

6. Apparatus as claimed in claim 1, in which the said fixed and the said moving scales are graduated directly in filter numbers, readings being taken in line with the zero of the scale corresponding to the screen for which the aperture of the said diaphragm has the greatest opening.

References Cited in the file of this patent

UNITED STATES PATENTS

| 2,132,048 | Robinette | Oct. 4, 1938 |
| 2,178,211 | Nolan | Oct. 31, 1939 |
| 2,544,196 | Varden | Mar. 6, 1951 |

FOREIGN PATENTS

| 253,733 | Germany | Nov. 16, 1912 |
| 572,995 | Germany | Mar. 25, 1933 |